United States Patent [19]

Shinohara

[11] 3,967,068
[45] June 29, 1976

[54] AUTOMATIC TELEPHONE MONITORING SYSTEM

[75] Inventor: Isao Shinohara, Neyagawa, Japan

[73] Assignee: Matsushita Electric Industrial Co., Ltd., Osaka, Japan

[22] Filed: Feb. 11, 1975

[21] Appl. No.: 549,032

Related U.S. Application Data

[63] Continuation of Ser. No. 380,130, July 17, 1973, abandoned.

[30] Foreign Application Priority Data

| | | |
|---|---|---|
| July 17, 1972 | Japan | 47-72283 |
| Aug. 7, 1972 | Japan | 47-78960 |
| Aug. 7, 1972 | Japan | 47-78961 |
| Aug. 21, 1972 | Japan | 47-83437 |
| Aug. 21, 1972 | Japan | 47-83438 |
| Sept. 25, 1972 | Japan | 47-96431 |
| Dec. 20, 1972 | Japan | 47-128573 |
| Dec. 20, 1972 | Japan | 47-128574 |
| Mar. 12, 1973 | Japan | 48-29190 |
| Nov. 25, 1973 | Japan | 48-135558 |
| Nov. 24, 1972 | Japan | 47-135719 |
| Mar. 12, 1973 | Japan | 48-30941 |

[52] U.S. Cl. ............................ 179/6 R; 360/78; 360/106

[51] Int. Cl.² ................ H04M 1/64; G11B 21/08; G11B 5/55

[58] Field of Search ............ 179/6 R, 6 AC; 360/74, 360/78, 106

[56] References Cited

UNITED STATES PATENTS

| | | | |
|---|---|---|---|
| 2,937,237 | 5/1960 | Zanardo | 179/6 AC |
| 3,250,856 | 5/1966 | Muller | 179/6 R |
| 3,590,159 | 6/1971 | Wolf et al. | 179/6 R |
| 3,592,968 | 7/1971 | Ogawa et al. | 179/6 R |

FOREIGN PATENTS OR APPLICATIONS

| | | | |
|---|---|---|---|
| 827,667 | 2/1960 | United Kingdom | 360/78 |

*Primary Examiner*—Raymond F. Cardillo, Jr.
*Attorney, Agent, or Firm*—Wenderoth, Lind & Ponack

[57] ABSTRACT

An automatic telephone monitoring system which comprises an endless magnetic recording tape having a plurality of groups of recording tracks, one of these groups of the tracks being used to record different kinds of messages to be transmitted to a caller, a second one of which is used to record individual messages from the callers, and the rest of which are associated in content with the first mentioned one of the groups and on which are recorded the corresponding kinds of messages to be transmitted to subsequent callers who have happened to dial a telephone coupled with the monitoring system after the all of the tracks of the second mentioned group have been used.

7 Claims, 27 Drawing Figures

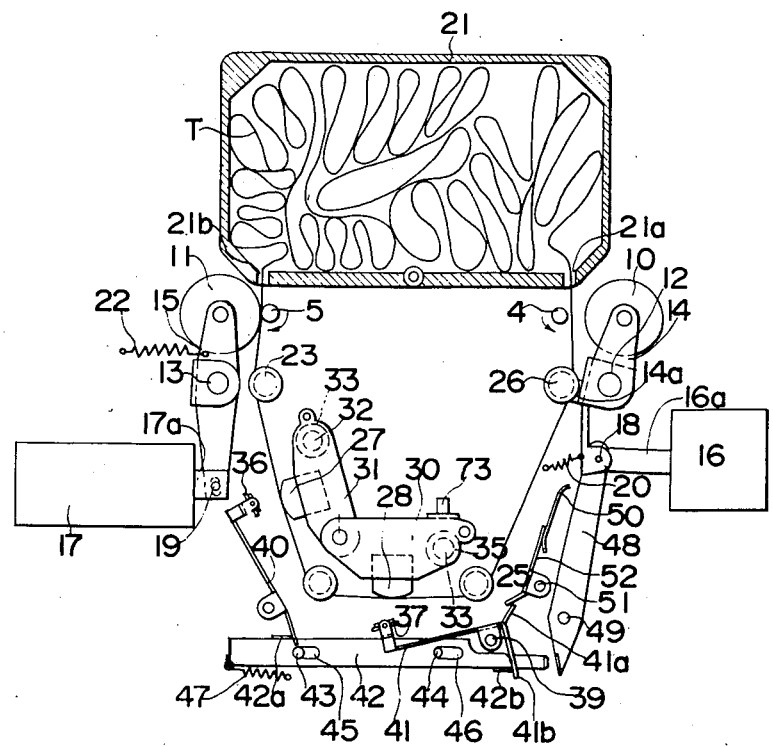
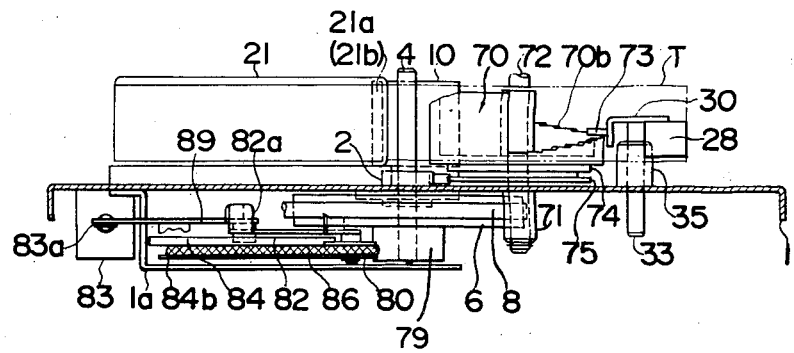

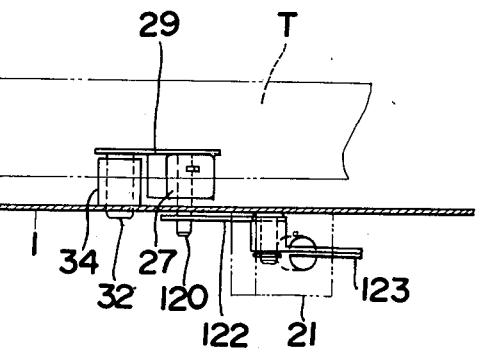
FIG. 20
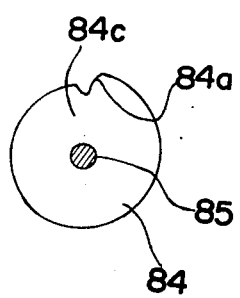
FIG. 27
FIG. 22
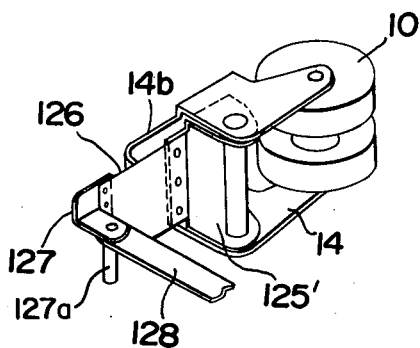
FIG. 21
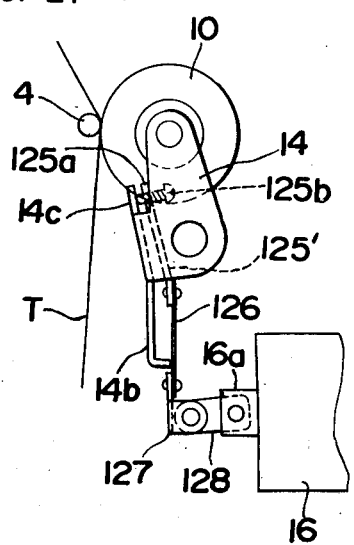
FIG. 23
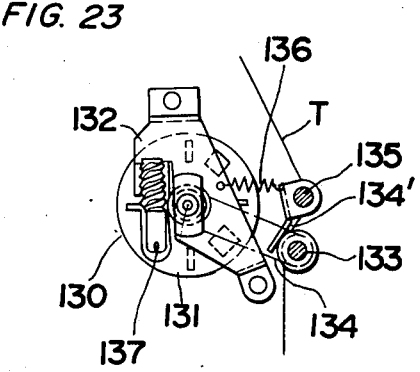

AUTOMATIC TELEPHONE MONITORING SYSTEM

This application is a continuation of our copending application Ser. No. 380,130 filed on July 17, 1973, now abandoned.

BACKGROUND OF THE INVENTION

The present invention relates to a telephone monitoring system for use in association with a telephone for automatically responding to and recording a telephone communication from a caller who has dialed the telephone number allocated to the telephone coupled with the telephone monitoring system herein disclosed.

More particularly, the present invention pertains to a telephone monitoring system of the type above referred to which has the following capabilities:

1. When the caller dials the telephone number of the telephone coupled with the telephone monitoring system herein disclosed (the latter telephone being hereinafter referred to as receiver's telephone), the system automatically responds to the caller's telephone and records a message from the caller for a predetermined period of time on one of a plurality of tracks of a multitrack magnetic tape. This mode of operation of the system can be repeated in number corresponding to the number of the tracks of the tape on which messages from respective callers are recorded.

2. Depending on the situation of the receiver, receiver's messages recorded on the tape can be selectively transmitted to the caller upon the receiver's telephone receiving an input signal from the caller's telephone.

3. After all of the tracks of the tape have been recorded upon with a corresponding number of messages from individual callers, the system automatically transmits to the callers who have happened to dial the receiver's telephone thereafter, a receiver's recorded message which corresponds in content to the selected one of the receiver's message mentioned in the preceding item.

Heretofore, it is common practice in offices or other business establishments to employ an automatic telephone monitoring system whereby, when there are no staff available to answer incoming telephone calls, an answer previously recorded on a magnetic tape is played to callers. In such a telephone monitoring system, when a person makes a call to a telephone equipped with the monitoring system, a prerecorded answer is played, and the caller is also informed that he or she may record a message, and then there is made available a certain amount of tape, on which the caller may record a message. It is general practice to employ the same tape both for a prerecorded answer and for subsequently recorded messages, the tape employed being commonly in cassete tape form, and different tracks thereon being made available for different messages. When all the tracks available for messages have been consumed, subsequent callers are informed that no more messages can be recorded, and simply hear the prerecorded answer. It is evident that there are a variety of situations in which staff may not be available for answering a telephone, and in which it is wished to employ an automatic telephone monitoring system, and where there are a corresponding variety of prerecorded answers for use in the different situations. For example, different answers to callers are required if an office is closed for the week-end, or closed until the following morning, or if staff are only temporarily absent.

According to the conventional monitoring system, it is necessary to provide and prepare as many different tapes as answers it is required to prerecord, and then, for each different situation to set the relevant tape in the recording equipment. This manipulation of different tapes is troublesome, and to some extent defeats the original purpose of automatic telephone monitoring systems which are intended to be an aid to business procedure. Also, the fact that there are different tapes to be identified and set up is conducive to error, and the wrong tape for a particular situation may be installed, especially considering that the telephone monitoring system is generally set up quickly.

SUMMARY OF THE INVENTION

Accordingly, an essential object of the present invention is to provide an automatic telephone monitoring system which functions satisfactorily without substantially incurring the inconveniences and disadvantages inherent in the conventional system of similar kind.

Another important object of the present invention is to provide an automatic telephone monitoring system which efficiently and effectively performs any one of the capabilities mentioned in the foregoing description.

A further object of the present invention is to provide an automatic telephone monitoring system of the type above referred to which can be easily assembled at relatively low cost and which can be easily handled without substantially requiring any skill in the handling procedure.

BRIEF DESCRIPTION OF THE DRAWINGS

These and other objects and features of the present invention will become apparent from the following description taken in conjunction with preferred embodiments thereof with reference to the accompanying drawings, in which;

FIG. 2 is a similar view of FIG. 1, showing a transducer head arrangement and its related parts, with a tape cartridge having the cover thereof removed, FIG. 4 is a cross sectional view taken along the line IV—IV in FIG. 1, FIG. 20 is a cross sectional view of a portion of the chassis, showing an arrangement of the first transducer head and the solenoid unit shown in FIG. 18, FIG. 21 is a top plan view of a pinch roller arrangement showing a modification thereof, FIG. 22 is a perspective view of the pinch roller arrangement of FIG. 21, FIG. 23 is a diagram showing a detecting unit for detecting a running condition of the magnetic tape, FIG. 27 is a top plan ciew of a modified crank wheel of an indexing unit drive mechanism.

BRIEF DESCRIPTION OF THE INVENTION

Figure 1:
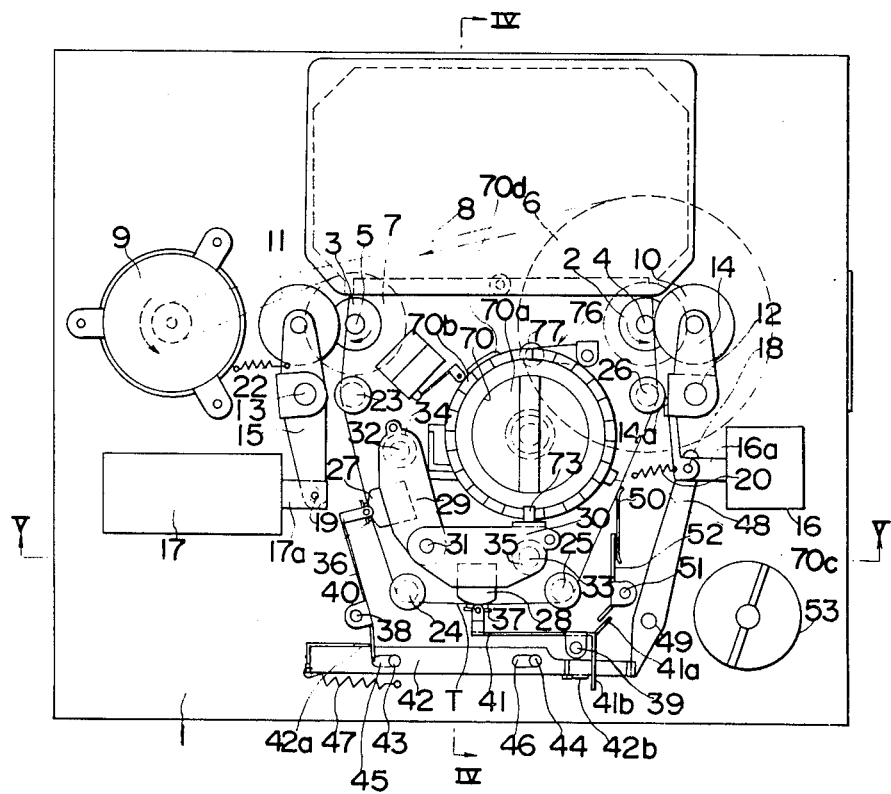
FIG. 1 is a top plan view of an automatic telephone monitoring system showing an arrangement of various components thereof disposed above a chassis.

Before the description of the present invention proceeds, it is to be noted that like parts are designated by like reference numerals throughout the accompanying drawings. It is also to be noted that, for a better understanding of the present invention, various arrangements of the automatic telephone monitoring system according to the present invention are individually described in the order given below.

MAGNETIC TAPE DRIVE SYSTEM

Referring to FIGS. 1 and 2, a chassis 1 carries a pair of capstans 4 and 5 selectively driven by a common motor 9 in a manner which will be described later. These capstans 4 and 5 are respectively supported in a rotatable, but not axially movable, manner by bearing sleeves 2 and 3 which are extending above and carried by chassis 1 in spaced relation with respect to each other. Respective lower ends of these capstans 4 and 5, which are situated below chassis 1, are rigidly mounted with flywheels 6 and 7 of different diameter, flywheels 6 and 7 being connected with the motor 9 by means of an endless belt 8 suspended in such a manner as to permit the capstans 4 and 5 to respectively rotate in the counterclockwise and clockwise directions. In association with these capstans 4 and 5, pinch rollers 10 and 11 are respectively provided, which will be hereinafter described.

The pinch roller 10 is mounted on a pivotable lever 14 having one end rotatably carrying roller 10 and the other end pivotally connected by a set pin 18 to a free end of a solenoid armature 16a of a solenoid unit 16 on the chassis 1, pivotable lever 14 being pivotally supported on the chassis 1 by means of a stand 12 which has one end supporting a substantially intermediate portion of lever 14 and the other end rigidly secured to the chassis 1. The pinch roller 10 is normally separated from the corresponding capstan 4 by a tension spring 20 acting to extend the solenoid armature 16a outwardly of the solenoid unit 16, roller 10 being in contact with capstan 4 only when armature 16a is retracted upon energization of solenoid unit 16.

The pivotable lever 14 is provided with a friction pad 14a contactable, only when the solenoid armature 16a of the solenoid unit 16 extended by the action of the tension spring 20, with a guide pin 26 secured on the chassis for giving a slight pressing force to the magnetic tape T contacting the guide pin 26. This friction pad 14a is, of course, separated from the guide pin 26 when the pinch roller 10 is engaged with the capstan 4 upon retraction of the solenoid armature 16a.

On the other hand, the pinch roller 11 is mounted on a pivotable lever 15 having one end rotatably carrying roller 11 and the other end pivotally connected by a set pin 19 to a free end of a solenoid armature 17a of a solenoid unit 17 on the chassis 1, pivotable lever 15 being pivotally supported on the chassis 1 by means of a stand 13 which has one end supporting a substantially intermediate portion of lever 15 and the other end rigidly secured on the chassis 1. The pinch roller 11 is, so long as the solenoid armature 17a is outwardly extended by the action of a tension spring 22, separated from the capstan 5 with the pivotable lever 15 pivoting about the axis of the stand 13 in the counterclockwise direction.

A tape cartridge 21 having opposed take-up and feed slots 21a and 21b as shown in FIG. 2 is firmly held in position on the chassis 1 with these slots 21a and 21b respectively located in the vicinity of the capstans 4 and 5. The tape cartridge 21 accommodates therein, in slackened state, a portion of the endless magnetic tape T which is not drawn out of cartridge 21. For guiding the travel of the endless tape T, a plurality of upright guide pins 23, 24, 25 and 26 are stationarily provided on the chassis 1 and arranged in spaced relation with respect to each other and in a substantially U-shaped configuration with the capstans 4 and 5 occupying respective positions corresponding to the individual ends of the figure "U".

In the arrangement so far described, retraction of the armature 16a of the solenoid unit 16 while the motor 9 is operated and the solenoid unit 17 is in a deenergized state with the solenoid armature 17a extended allows the tape T to run in the direction from the feed slot 21b to the take-up slot 21a of the cartridge 21 while sandwiched between the capstan 4 and the pinch roller 10 engaged thereto. On the other hand, retraction of the solenoid armature 17a of the solenoid unit 17 while the motor 9 is operated and the solenoid unit 16 is in a deenergized state with the solenoid armature 16a extended allows the tape T to run in the opposite direction from the take-up slot 21a to the feed slot 21b of the cartridge 21 while sandwiched between the capstan 5 and the pinch roller 11. In either case, the portion of the tape T drawn out of the cartridge 21, travels round the upright guide pins 23, 24, 25 and 26.

MAGNETIC TAPE

Figure 3:
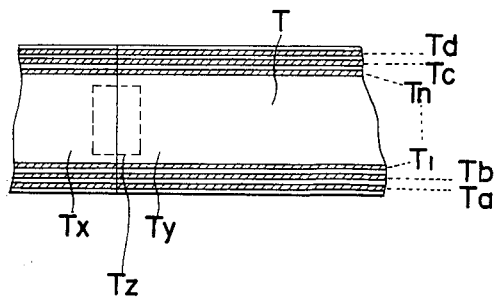
FIG. 3 is an elevational view of a magnetic tape employed in the present invention, only a portion of which is shown.

Referring now to FIG. 3, the tape T employed in association with the telephone monitoring system of the present invention is of an endless type and which may be made by joining the opposed ends Tx and Ty thereof together by the use of a metallic foil Tz having one surface coated with adhesive material. The endless magnetic tape T must have a sufficient width, corresponding to at least five tracks and, in the instance shown, the tape T is illustrated as having a plurality of tracks Ta, Tb, Tl to Tn wherein n is an integer, Tc and Td. Of these tracks, the tracks Tl to Tn should be understood as provided for recording thereon the corresponding number of telephone communications received by a telephone equipped with the telephone monitoring system of the present invention.

The tracks Ta and Tb are to be similarly understood as provided for recording thereon the corresponding number of different messages to be selectively conveyed, depending on the situation of the telephone receiver, to the telephone caller who has happened to make a telephone communication to such telephone receiver. These messages on the tracks Ta and Tb are hereinafter referred to as receiver's messages and examples of these are, "This is the residence of Mr. XXX. Sorry, Mr. XXX is now out and you are listening to a recorded message from Mr. XXX. After this record has finished, you have one minute to record a message, if you wish. Thank you." and "This is the office of XXX and Co., Ltd. Sorry, the office is now closed and you are listening to a recorded message. After this record has finished, you have one minute to record a message, if you wish. Thank you."

These receiver's particular messages on the respective tracks Ta and Tb should be recorded prior to occurrence of particular events, i.e., before Mr. XXX goes out and before closure of the office, respectively represented by the contents of the receiver's messages, or otherwise may be permanently recorded thereon depending on the contents of these receiver's messages and/or the situation of the telephone receiver.

The corresponding number of messages to be conveyed to the individual telephone callers who have happened to make a telephone communication after all of the tracks Tl to Tn on the tape T have been completely consumed are to be understood as recorded on the tracks Tc and Td. These messages on the tracks Tc and Td are hereinafter referred to as receiver's requests and examples of these are, "This is the residence of Mr. XXX and you are listening to a recorded message from Mr. XXX. Sorry, Mr. XXX is now out and will be back by noon. Please telephone to Mr. XXX again after noon. Thank You," and "This is the office of XXX and Co., Ltd. and you are listening to a recorded message from the office. Sorry, the office is now closed. Please telephone again tomorrow. Thank you."

It is to be noted that, in view of the fact that the receiver's requests on the tracks Tc and Td are intended to be reproduced and conveyed to each telephone caller making a telephone communication after the tracks Tl to Tn have been completely filled, the contents of these receiver's requests should preferably correspond to those of the receiver's messages on the tracks Ta and Tb, respectively, as can be understood from the above examples of these receiver's messages and requests.

Similarly, these receiver's particular requests on the respective tracks Tc and Td should be recorded prior to occurrence of the particular events respectively represented by the contents of the receiver's messages as hereinbefore described, or otherwise may be permanently recorded thereon depending on the contents of these receiver's messages on the tracks Ta and Tb and/or the situation of the telephone receiver.

It is to be noted that the time during which each message from the telephone caller which is to be recorded on the corresponding one of the tracks Tl to Tn is determined by the length of the magnetic tape T and, therefore, the longer the magnetic tape T is, the more time each telephone caller can have to record his or her message. However, in the description of the present invention, it is, for the sake of brevity, assumed that the tape T has a sufficient length enough to record 1 minute's message.

As will become clear from the later description, while the receiver's messages and requests are assumed to be substantially permanently recorded on the respective tracks Ta, Tb, Tc and Td of the tape T, reproducing of the tracks Ta and Tb is effected by a first magnetic transducer head 27 and that of the tracks Tc and Td by a second magnetic transducer head 28, the latter being also used to record and playback selectively the tracks Tl and Tn. Of course, both the heads 27 and 28 may be used not only for recording purpose, but also for recording and/or reproducing purposes if a suitable switching circuit is provided in a substantially similar manner as in a commercially available magnetic tape recorder. Reference to each of the first and second magnetic transducer heads 27 and 28 will be now made in the following description.

FIRST TRANSDUCER HEAD

Figure 5:
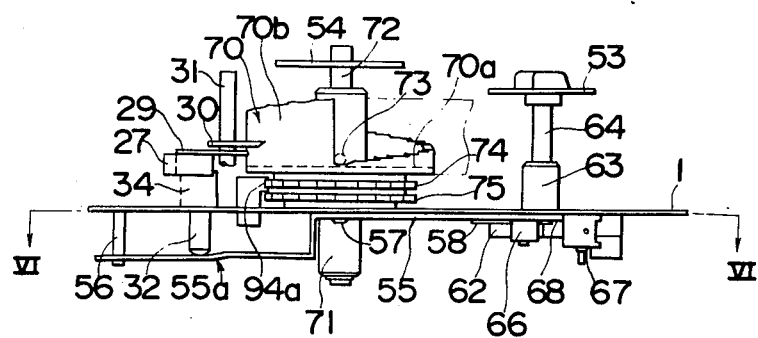
FIG. 5 is a cross sectional view taken along the line V—V in FIG. 1.

As stated above, the first transducer head 27 is utilized to record and/or reproduce the receiver's messages on the respective tracks Ta and Tb of the magnetic tape T. The first transducer head 27 is rigidly mounted on a support plate 29 positioned between the upright guide pins 23 and 24. The support plate 29 has one end mounted on a support rod 31, rigidly projecting from and above the chassis 1, for axial sliding movement in either direction parallel to support rod 31, and the other end rigidly connected with a slide rod 32 axially slidably extending through a bearing sleeve 34, rigidly mounted on the chassis 1, and terminating below chassis 1 as shown in FIG. 5. In this arrangement, axial movement of the slide rod 32 through the bearing sleeve 34 accompanies the corresponding movement of the support plate 29 and, hence, the first transducer head 27. The axial movement of slide rod 32 described above is effected by operating a switching knob 53, the operative connection between slide rod 32 and knob 53 being hereinafter described with particular reference to FIGS. 5 and 6.

Figure 6:
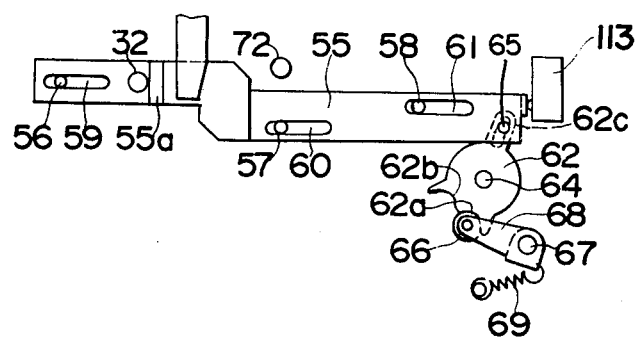
FIG. 6 is a top plan view of a portion of FIG. 5 showing a track selection mechanism.
Figure 7:
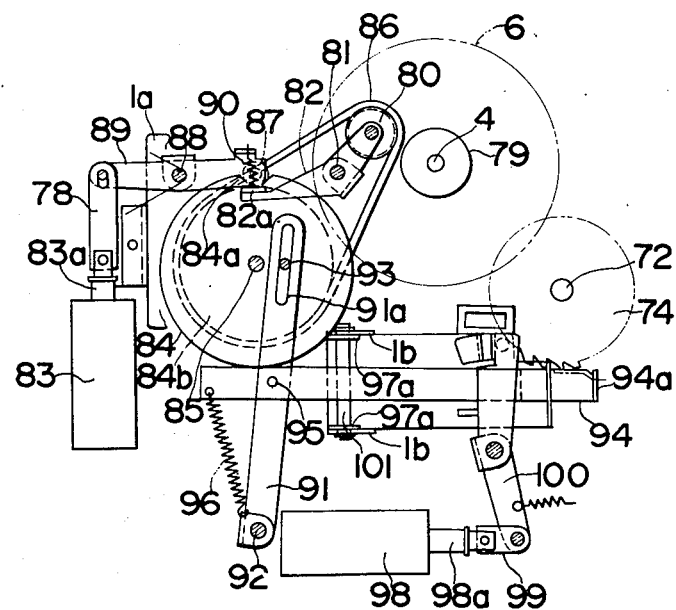
FIG. 7 is is a top plan view of an indexing unit drive mechanism conditioned in one position.
Figure 8:
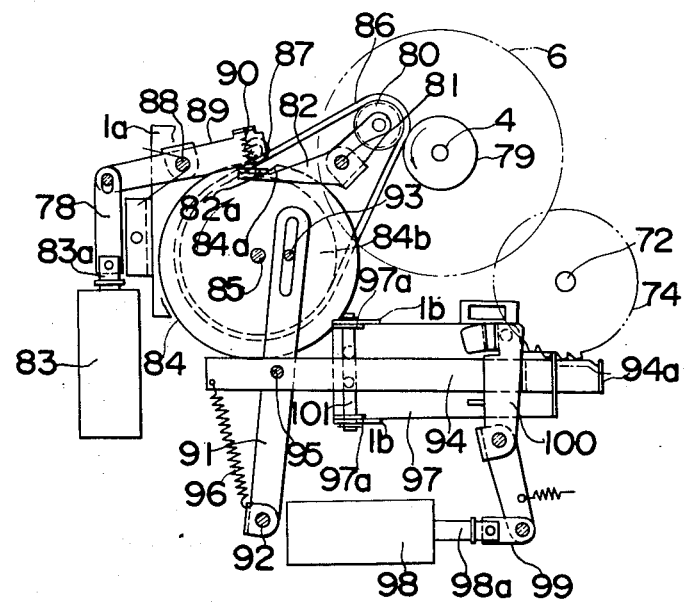
FIG. 8 is a similar view to FIG. 7, but conditioned in another position.
Figure 9:
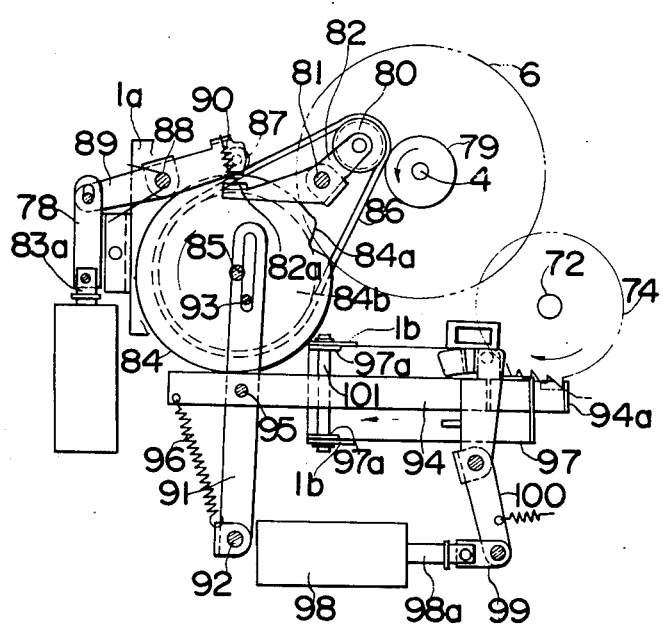
FIG. 9 is a similar view to FIG. 7, but conditioned in a further position.
Figure 10:
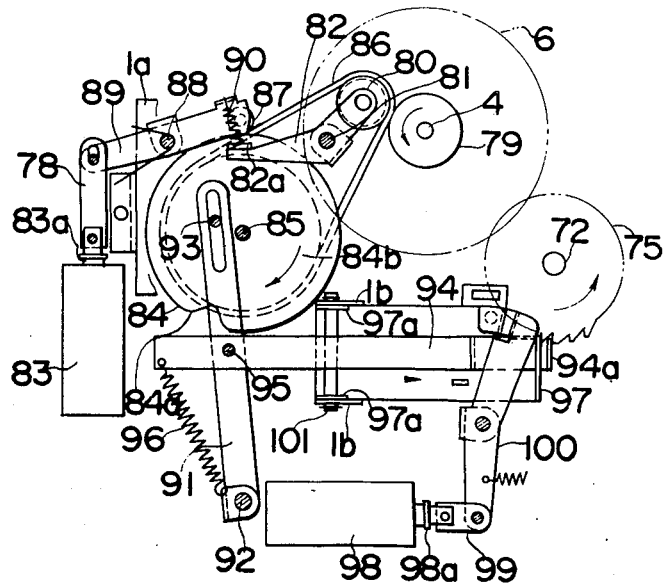
FIG. 10 is a similar view to FIG. 7, but conditioned in a still further position.

Referring now to FIGS. 5 and 6, the switching knob 53 is mounted on a shaft 64 supported by a bearing sleeve 63 in a rotatable, but non-axially movable, manner and terminating below chassis 1, bearing sleeve 63 being rigidly secured on the chassis 1. Disposed beneath the chassis 1 between the lower ends of the slide rod 32 and shaft 64 is a slider 55 and the detent mechanism by which the switching knob 53 is defined to be rotatable between detent positions corresponding in number to the number of the tracks of the magnetic tape T on which the receiver's messages are recorded, i.e., betwen first and second detent positions respectively corresponding to the tracks Ta and Tb.

To begin with the detent mechanism above referred to, as best shown in FIG. 6, it comprises a cam disc 62 secured to the lower end of the shaft 64 for rotation together with shaft 64 and having three radially outwardly extending projections for defining two detent recesses 62a and 62b in cooperation with the periphery of cam disc 62. These detent recesses 62a and 62b may be made by notching the cam disc 62 towards the axis of the shaft 64. Selectively engageable in detent recesses 62a and 62b, depending on the position of the switching knob 53, is a detent roller 66 rotatably carried by a pivotable lever 68 which is pivotally connected to the undersurface of the chassis 1 by means of an axis member 67 and is normally pivoted in one direction about axis member 67 by a tension spring 69 so disposed as to permit the detent roller 66 to be collapsed in any one of the detent recesses 62a and 62b.

Preferably, the two of the radially outwardly extending projections on the cam disc 62, which are situated on both sides of the remaining one, have a height greater than that of said remaining one, thereby preventing the detent roller 66 from riding thereover, which may otherwise take place when the switching knob 53 is excessively rotated in the direction from one position to anywhere other than the other position. The cam disc 62 is also formed on its periphery with an eyelet 62c for connection with the slider 55 in a manner as will be now described.

The slider 55 having a plurality of guide slots 59, 60 and 61 is slidably supported to the chassis 1 by headed pins 56, 57 and 58 respectively extending through the guide slots 59, 60 and 61 and tapped into chassis 1. Slider 55 has one end portion rigidly mounted with an engagement pin 65 loosely engaged in the eyelet 62c of the cam disc 62 and the other end portion formed with a step as indicated by 55a, the lower end of the slide rod 32 below the chassis 1 slidably resting on a portion of the slider 55 on both sides of the step 55a. In the condition as shown in FIGS. 5 and 6, the first transducer head 27 is in position to reproduce the track Ta of the magnetic tape T with the lower end of the slide rod 32 resting on the slider 55 at a position below the step 55a. If the switching knob 53 is rotated to the second detent position from the first detent position in which the above mentioned condition has been assumed, the detent roller 66, that has been engaged in the detent recess 62a, rides over on to the other detent recess 62b and the slider 55 is moved in such a direction as to cause the lower end of the slide rod 32 to ride over the step 55a, whereby the first transducer head 27 is brought into position to reproduce the track Tb of the magnetic tape T.

It should be noted that the length of the slide rod 32 must be, in view of the foregoing, suitably selected to enable the first transducer head 27 to selectively be aligned with the tracks Ta and Tb according to the position of the lower end of the slide rod 32 on the slider 55 with respect to the step 55a, i.e., the position of the switching knob 53.

Referring back to FIGS. 1 and 2, contact between the first transducer head 27 supported as hereinbefore described and the running magnetic tape T is reliably ensured by a tape padding mechanism of the construction as hereinafter described. It should be noted that the tape padding mechanism to be hereinafter described is partly associated with the first transducer head 27 and partly associated also with the second transducer head 28.

The tape padding mechanism above referred to comprises a sliding plate 42 having at least one pair of guide slots 45 and 46 and slidably secured to the undersurface of the chassis 1 by means of headed pins 43 and 44 respectively extending through guide slots 45 and 46 and tapped into the chassis 1. The sliding plate 42 is normally biased in one direction by a tension spring 47 interposed between one end of plate 42 and a portion of the chassis 1. The other end of the plate 42 is engageable with an intermediate lever 48 having one end adapted to engage such other end of sliding plate 42 and the other end loosely connected to the free end of the solenoid armature 16a of the solenoid unit 16, intermediate lever 48 being pivotally supported by the chassis 1 through an axis member 49 which extends through lever 48 and is tapped into chassis 1. In the arrangement so far described, it is clear that movement of the sliding plate 42 in the opposite direction against the tension spring 47 is effected when the solenoid armature 16a is retracted, the condition of which is illustrated in FIG. 1.

The tape padding mechanism further comprises a pair of support levers 40 and 41, both pivotally secured to the chassis 1 by respective axis members 38 and 39 tapped therethrough into the chassis 1. The support lever 40 has one end extremity rigidly provided with a pad member 36, which may be made of felt and is adapted to abut against the first transducer head 27 with the tape T situated therebetween, and the other end extremity engageable with a projection 42a integrally formed in the sliding plate 42. Although not shown, the support lever 40 is normally biased in one direction about the axis of the axis member 38 by a spring member so that the pad member 36 is constantly abutted against the first transducer head 27. Disengagement of the pad member 36 away from the first transducer head 27 as shown in FIG. 2 takes place when the sliding plate 42 is moved in the pulling direction of the tension spring 47 upon extension of the solenoid armature 16a, in which condition the projection 42a on the plate 42 causes the support lever 40 to pivot against the spring member (not shown) with the pad member 36 moving away from the first transducer head 27.

SECOND TRANSDUCER HEAD

The second transducer head 28 is utilized to record and/or reproduce the messages from the respective telephone callers which have been recorded on the tracks Tl to Tn and also to record and/or reproduce the receiver's requests on the tracks Tc and Td, as hereinbefore described.

The second transducer head 28 is rigidly mounted on a support plate 30 positioned between the upright guide pins 24 and 25. The support plate 30 has one end mounted on the support rod 31 for axial sliding movement in either direction parallel to support rod 31, and the other end rigidly connected with a slide rod 33 axially slidably extending through a bearing sleeve 35 rigidly mounted on the chassis 1. The length of the slide rod 33 must be sufficient to guide the second transducer head 28 to stepwisely move in a distance corresponding to the total width of the tracks Tl to Tn and Tc and Td of the magnetic tape T. As clearly shown in FIGS. 1 and 4, the support plate 30 is formed with a stay 73 projecting rearwardly with respect to the second transducer head 28 and at right angles to the direction of movement of transducer head 28.

In association with the second transducer head 28, the tape padding mechanism hereinbefore referred to includes the support lever 41 having one end extremity rigidly provided with a pad member 37, which may be made of felt and is adapted to abut against the second transducer head 28 in the same manner as the pad member 36 to the first transducer head 27, the other end extremity of which is integrally formed with a pair of arms 41a and 41b. The arm 41b of support lever 41 is engageable with a projection 42b, integrally formed on the sliding plate 42, by a spring member (not shown) acting to pivot lever 41 about the axis of the axis member 39 with the pad member 37 biased to abut against the second transducer head 28 as shown in FIG. 1. In this arrangement, in a similar manner as the support lever 40, retraction of the solenoid armature 16a upon energization of the solenoid unit 16 causes the sliding plate 42 to move against the tension spring 47 with the projection 42b moving away from the arm 41b of the support lever 41. At this time, however, the support lever 41 is pivoted by the spring member (not shown) about the axis member 39 thereby permitting the pad member 37 to abut against the second transducer head 28 with the tape situated therebetween as shown in FIG. 1.

Engageable with the arm 41a of the support lever 41 are a pair of spaced elastic contact members 50 carried by a pivotable member 52 having one end rigidly connected with contact members 50 and the other end engageable with arm 41a, a substantially intermediate portion of pivotable member 52 being pivotally secured to the undersurface of the chassis 1 by means of a set pin 51. These contact members 50 are selectively brought close to and away from the tape T in synchronism with the pad members 36 and 37 in response to the position of the solenoid armature 16a of the solenoid unit 16. However, these contact members 50 serve as a detector for detecting completion of each run of the endless tape T and are, when in contact with the tape T, shortcircuited to each other only by the metallic foil Tz (FIG. 3) used to connect the opposite ends of the tape T to make the latter endless. The pivotable member 52 carrying contact members 50 is normally biased about the set pin 51 so that the contact members 50 are separated away from the tape T during the extension of the solenoid armature 16a out of the solenoid unit 16 as shown in FIG. 2.

Disposed in the vicinity of the stay 73 of the second transducer head support plate 30 is an indexing unit 70 which will be hereinafter described with particular reference to FIGS. 1, 4 and 5.

Referring now to FIGS. 1, 4 and 5, the indexing unit 70 comprises a disc 70a mounted above the chassis 1 and on a shaft 72 for rotation together with shaft 72. This disc 70a has an upper surface integrally formed with a substantially spirally stepped member 70b, as best seen from FIG. 5, having a plurality of steps, the level between the highest and lowest steps substantially corresponding to the total width of the tracks Tl to Tn plus Tc and Td while the number of the steps on the spirally stepped member 70b is the same as that of the tracks Tl to Tn plus Tc and Td of the magnetic tape T.

The support plates 29 and 30 for the first and second transducer heads 27 and 28 are, as viewed from FIGS. 4 and 5, downwardly biased by a common spring element or separate spring elements (not shown) with the stay 73 in the support plate 30 firmly resting any one of the steps of spirally stepped member 70b.

The shaft 72 has one end provided with a track selection knob 54 and the other end situated below the chassis 1 and journalled by a bearing boss 71 secured to the undersurface of the chassis 1.

In the arrangement so far described, so long as the stay 73 is resting on the lowest step of the member 70b, the second transducer head 28 is aligned with the track Tl of the magnetic tape T and, as stay 73 stepwisely rides over the spirally stepped member 70b to the highest step thereof in response to rotation of the selection knob 53, the second transducer head 28 is selectively aligned with the remaining tracks T2 to Tn and Tc and Td.

Mounted integrally or separately on the shaft 72 between the undersurface of the disc 70a and the chassis 1 is a pair of ratchet wheels 74 and 75 of the same size, but having opposed tooth orientations for a reason which will become clear later. Briefly, however, the indexing unit 70 is not only rotated manually about the axis of the shaft 72, but also automatically rotated in both directions by the action of a trigger lever 94 selectively engageable with either of these ratchet wheels 74 and 75.

For avoiding an arbitrary rotation of the indexing unit 70, a detent mechanism is provided as generally indicated by 76 in FIG. 1. This detent mechanism is substantially the same in construction as that employed in association with and described under the heading of "First Transducer Head" and, therefore, the details thereof are omitted for the sake of brevity. However, a slight difference resides in that, although the detent roller 66 of the foregoing detent mechanism is selectively engageable in the detent recesses 62a and 62b formed in the cam disc 62, a roller 77 of this detent mechanism 76 is selectively engageable in tooth grooves of both of the ratchet wheels 74 and 75.

Hereinafter, a mechanism by which the indexing unit 70 is automatically rotated in either direction will be described with reference to FIGS. 4 and 7 to 17.

INDEXING UNIT DRIVE MECHANISM

Referring now to FIGS. 4 and 7 to 17, the indexing unit drive mechanism comprises a clutch unit, a cranking unit and an engagement guide unit. The clutch unit includes a drive wheel 79 mounted below the flywheel 6 in coaxial relation to flywheel 6 and the capstan 4 as best shown in FIG. 4, which wheel 79 may be integrally formed with flywheel 6. This clutch unit further includes a driven roller 80 rotatably carried by a pivotable lever 82 pivotally secured to the undersurface of the chassis 1 through a set pin 81 with roller 80 located in the vicinity of the drive wheel 79, and a solenoid unit 83 secured to the undersurface of the chassis 1 and having a solenoid armature 83a operatively coupled with a seesaw lever 89 through a connecting strip or rod 78. The seesaw lever 89 is pivotally supported at a substantially intermediate portion thereof by a spindle 88 to an auxiliary chassis 1a, which is secured to the chassis 1 in spaced relation thereto as shown in FIG. 4, and has one end rotatably carrying a roller element 87 opposed to the other end of lever 89 which is connected with the connecting strip 78. As will be described later in detail, a tension spring 90 is interposed between the seesaw lever 89 adjacent the roller element 87 and the pivotable lever 82 adjacent the other end thereof remote from the driven roller 80 so that the roller element 87 carried by the seesaw lever 89 is biased to rest on a platform 82a integrally formed with the pivotable lever 82 adjacent roller element 87.

The crank unit includes a rotary disc 84 rotatably supported by the auxiliary chassis 1a by a shaft 85 projecting from auxiliary chassis 1a towards the undersurface of the chassis 1 with rotary disc 84 situated between chassis 1 and 1a. The rotary disc 84 is formed on its periphery with a detent recess 84a, into which the roller element 87 is engageable when the solenoid armature 83a is retracted upon energization of the solenoid unit 83, and is also formed on one surface facing the chassis 1 with a crank pin 93. A pulley 84b is integrally or separately formed on the other surface of rotary disc 84 in coaxial relation to disc 84 and the shaft 85, and an endless belt 86 is suspended between pulley 84b and the driven roller 80 for transmitting a rotational force of the drive wheel 79 to rotary disc 84 via driven roller 80 when the latter is engaged with the drive wheel 79.

The arrangement so far described should be designed such that, as will become clear from the later description, one complete rotation of the rotary disc 84 is necessary and sufficient to rotate the ratchet wheels 74 and 75 in an angular distance corresponding to the pitch between two adjacent teeth thereof, i.e., to shift the second transducer head 28 from its alignment with one track to the next adjacent track of the magnetic tape T.

The crank unit further includes a crank lever 91 having one end pivotally supported to the chassis 1 by means of a fixture member 92 and the other end formed with a slot 91a and connected with the rotary disc 84 with the crank pin 93 loosely extending through slot 91a. The length of the slot 91a in the crank lever 91 must be greater than the diameter of the circular path of travel of crank pin 93 about the axis of the shaft 85 so that rotation of the rotary disc 84 causes the crank lever 91 to pivot about the axis of the fixture member 92. Operatively associated with this crank lever is an actuating lever 94 having one end formed with a nail or projection 94a selectively engageable with teeth of the ratchet wheels 74 and 75 and pivotally connected with the crank lever 91 by a pin member 95 at a portion adjacent to the other end of actuating lever 94. A tension spring 96 is interposed between a fixed portion, for example, the fixture member 92, and the end of the actuating lever 94 opposite to the nail 94a so that the latter is biased to a position close to the teeth of the ratchet wheels 74 and 75.

The engagement guide unit includes a guide structure 97 of a construction as will be described later and a solenoid unit 98 having a solenoid armature 98a pivotally connected with a connecting piece 99 which is in turn coupled to an operating lever 100. This engagement guide unit is best shown in FIGS. 11 to 17 and, therefore, reference is exclusively made to these drawings.

Figure 11:
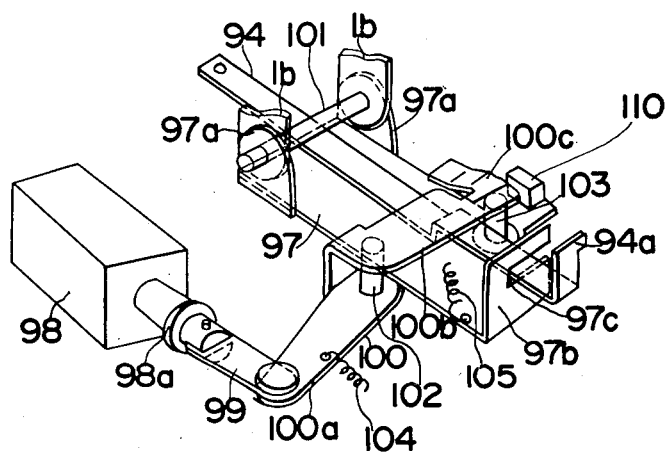
FIG. 11 is a perspective view of a guide structure employed in the automatic telephone monitoring system.
Figure 12:
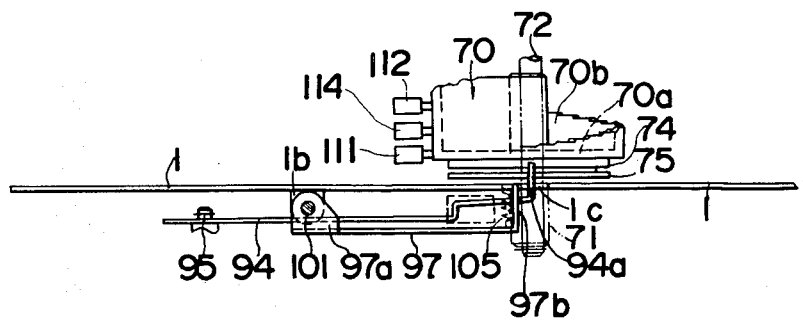
FIG. 12 is a sectional side view of the guide structure mounted with respect to the chassis.

The guide structure 97 is of the shape as shown in FIG. 11 and has one end formed with a pair of spaced lugs 97a which are pivotally connected to respective arm members 1b, integrally or separately provided with the undersurface of the chassis 1, by means of a spindle member 101 having both ends extending through one pair of the lug 97a and arm member 1b and another pair of the lug 97a and arm member 1b, respectively, thereby permitting the guide structure 97 to pivot about the axis of the spindle member 101. The other end of the guide structure 97 is bent to form an upright position 97b extending towards the chassis 1 and having formed therein a guide slit 97c through which a portion of the actuating lever 94 adjacent to the nail 94a slidably extends, the width of guide slit 97c being, hence, equal to or slightly greater than the thickness of the actuating lever 94. In this arrangement, the nail 94a of the actuating lever 94, which loosely extends upwards through an opening 1c formed in the chassis 1, is selectively aligned with the ratchet wheels 74 and 75 depending on the direction of pivot of the guide structure about the spindle member 101 which is effected by the solenoid unit 98 in such a manner as hereinafter described.

The operating lever 100 for transmitting movement of the solenoid armature 98a to the guide structure 97 thereby to pivot the latter is composed of a pair of sections 100a and 100b integral with each other, but displaced in level with respect to each other as clearly shown in FIG. 11. A fitting member 102 extends through the operating lever 100 at the joining portion of these sections 100a and 100b and is tapped into the chassis 1 for pivotally supporting operating lever 100. The section 100b of the lever 100 has an upper surface adapted to slidingly contact the undersurface of the chassis 1 and has a free end integrally formed with a platform 100c downwardly inclined, i.e., outwardly diverging from the undersurface of the chassis 1.

Slidingly engageable with the platform 100c of the operating lever 100 is a round-tipped pin 103 upwardly extending towards the chassis 1 from and rigidly carried by the guide structure 97. Alternatively, this round-tipped pin 103 may be substituted by a roller member in which case such roller member should be rotatably carried by the guide structure 97 in contact with the platform 100c of the operating lever 100.

Figure 13:
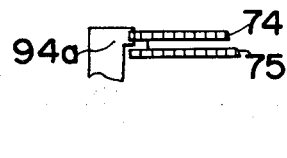
FIG. 13 is a side view of a portion of FIG. 12, showing a nail member engaged with a ratchet wheel.
Figure 14:
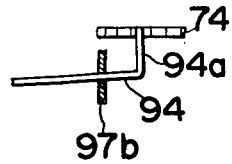
FIG. 14 is a similar view to FIG. 13, but viewed from a different angle.

In the above arrangement, a tension spring 104 interposed between the section 100a of the operating lever 100 and a portion of the chassis 1 acts to pull the solenoid armature 98a out of the solenoid unit 98 while a tension spring 105 interposed between a portion of the guide structure 97 adjacent to the upright portion 97b and the chassis 1 acts to pivot the guide structure 97 with the round-tipped pin being thereby biased to constantly contact the platform 100c. In this condition, the nail 94a of the actuating lever 94 operatively coupled to the guide structure 97 through the guide slit 97c in the upright portion 97b of the guide structure 97 is, as shown in FIGS. 13 and 14, in position ready to rotate the ratchet wheel 74 and, hence, the indexing unit 70 in the clockwise direction as viewed from FIG. 1.

Figure 15:
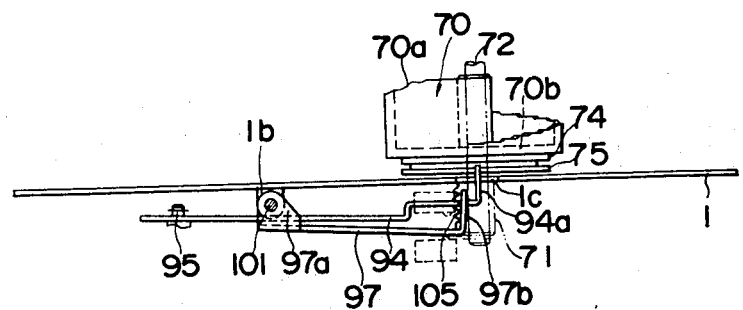
FIG. 15 is a similar view to FIG. 12, but showing the guide structure in another position.
Figure 16:
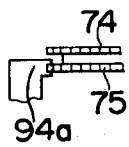
FIG. 16 is a similar view to FIG. 13, showing the nail member engaged with another ratchet wheel.
Figure 17:
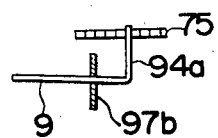
FIG. 17 is a similar view to FIG. 16, but viewed from a different angle.

If the solenoid armature 98a is retracted upon energization of the solenoid unit 98, the operating lever 100 is pivoted about the fitting member 102 with the platform 100c downwardly depressing the round-tipped pin 103 thereby causing the guide structure 97 to pivot about the spindle member 101 with the upright portion 97b thereof tended to move away from the undersurface of the chassis 1. In this condition, the nail 94a of the actuating lever 94 is, as shown in FIGS. 15 to 17, in position ready to rotate the ratchet wheel 75 and, hence, the indexing unit 70 in the counterclockwise direction as viewed from FIG. 1.

It is to be noted that the space between the tip of the platform 100c and the undersurface of the chassis 1 above such tip thereof corresponds to the distance between the ratchet wheels 74 and 75 and, therefore, selective alignment of the nail 94a with any of the ratchet wheel 74 and 75 can be reliably ensured depending on the direction of pivot of the guide structure 97.

SWITCH ARRANGEMENT AND OPERATION

Assuming that the selection knob 53 is positioned such as to align the first transducer head 27 with the track Ta of the magnetic tape T, the motor 9 is operated in response to an input signal transmitted from a caller's telephone to the receiver's telephone electrically coupled with the telephone monitoring system of the present invention. At the same time, in response to the input signal transmitted to the receiver's telephone, the first transducer head 27 is brought into operative position while the solenoid unit 16 is energized. Upon energization of the solenoid unit 16, the pinch roller 10 is engaged to the capstan 4 in the manner as hereinbefore described, thereby driving the endless magnetic tape T from the feed slot 21b to the take-up slot 21a of the tape cartridge 21. Simultaneously therewith, the pad members 36 and 37 and the contact members 50 are respectively brought into contact with the magnetic tape T by the retraction of the solenoid armature 16a of the solenoid unit 16 as hereinbefore described. In this condition, as the tape T runs, the track Ta of the magnetic tape T is reproduced by the first transducer head 27 and the receiver's message recorded on this track Ta is, therefore, transmitted to the caller's telephone through telephone lines.

As the metallic foil Tz plated to the tape T in the manner as hereinbefore described or the prescribed purpose approaches the contact members 50, i.e., upon substantial completion of a single run of the tape T, the contact members 50 are shortcircuited to each other by the metallic foil Tz whereby the first transducer head 27 is brought into an inoperative position while the second transducer head 28 is brought into its operative position in readiness for recording a telephone communication from the caller on one of the tracks Tl to Tn, for example, track Tl, depending upon the setting of the shaft 72 and, hence, the indexing unit 70. In the manner as hereinbefore described, the telephone communication from the caller can be recorded on the track Tl of the magnetic tape T for a predetermined period of time determined by the length of the magnetic tape T used.

Upon subsequent shortcircuit between the contact members 50, i.e., completion of another run of the magnetic tape T, the second transducer head 28 is brought into an inoperative position while the solenoid unit 83 becomes energized in response to a signal from the contact members 50 then shortcircuited. As the solenoid armature 83a of the solenoid unit 83 is retracted upon energization of the solenoid unit 83, the pivotable or clutch lever 82 is pivoted about the axis 81 by the action of the tension spring 90 with the driven roller 80 becoming engaged with the driven wheel 79, the detent roller 87 being then disengaged from the detent recess 82a in the crank wheel 84, whereby rotation of the drive wheel 79 is transmitted to the crank wheel 84 in the manner as hereinbefore described.

As the crank wheel 84 rotates about the axis 85 the actuating lever 94 reciprocately moves linearly in the manner hereinbefore described, thereby causing the nail 94a to transfer the ratchet wheel 74 so that the second transducer head 28 is shifted so as to be aligned with the next adjacent track T2 in the manner as hereinbefore described. It is to be noted that the solenoid unit 98 is at this time deenergized to permit the guide structure 97 to be positioned as pulled by the tension spring 105 so that the nail 94a of the actuating lever 94 is ready to engage with the ratchet wheel 74.

A switch assembly 110 mounted on the guide structure 97 is composed of a pair of switches. One switch is either opened or closed when the nail 94a is accurately aligned with the ratchet wheel 74 and closed or opened when the nail 94a is not aligned with the ratchet wheel 74, while the other switch is either closed or opened when the nail 94a is accurately aligned with the ratchet wheel 75 and opened or closed when the nail 94a is not aligned with the ratchet wheel 75. In other words, the switch assembly 110 serves as a detector for detecting the position of the platform 100c of the operating lever 100 with respect to the round-tipped pin 103 and for generating an output signal therefrom only when both the switches constituting the switch assembly 110 are respectively closed and opened or opened and closed. In particular, an output signal generated from the switch assembly 110 when the nail 94a is accurately aligned with the ratchet wheel 75, i.e., when the solenoid unit 98 is energized, is utilized to insert the second transducer head 28, that has been inserted in a recording circuit (not shown), in a reproducing circuit while the first transducer head 27 is maintained in the inoperative position. Energization of the solenoid unit 98 for the above purpose is effected by the application of an input signal of predetermined frequency thereto through the telephone line, i.e., when remote control is to be appreciated.

In any event, upon completion of a stepwise rotation of the indexing unit 70 thereby to shift the second transducer head 28 so as to permit the latter to be aligned with the next adjacent track T2, one of a plurality of switches arranged in the vicinity of the indexing unit 70, as indicated by 111, detects the completion of such stepwise rotation of the indexing unit 70 and then generates an output signal with which the various electrically operated mechanisms of the telephone monitoring system of the present invention are brought into the original positions in readiness for the next input of a telephone call, thus completing one cycle of operation of the telephone monitoring system.

Assuming that the above described cycle of operation of the telephone monitoring system is repeated each time the input signal is transmitted thereto from a caller's telephone to the receiver's telephone coupled with monitoring system and the last track Tn has been completely recorded, the second transducer head 28 is shifted so as to align with the track Tc, on which the receiver's request whose content corresponds to that of the receiver's message recorded on the track Ta is recorded. Reproduction of the track Tc is thereafter repeated even if input signals are fed thereto after the last track Tn has been recorded, i.e., all of the tracks Tl to Tn have been used. This is possible by the reason that a switch 112 arranged in the vicinity of the indexing unit 70 detects the fact that no track is available for recording telephone communications made after all of the tracks Tl to Tn have been utilized. This switch 112 is actuated by a projection 70c, formed in the spirally stepped member 70b at a position facing to switch 112 and so disposed as to actuate switch 112 when the second transducer head 28 is aligned with the tracks Tc and Td of the magnetic tape T, so that the monitoring system is made to act as a tape reproducing device.

Even in the case where the selection knob 53 is positioned such as to align the first transducer head 27 with the track Tb, substantially the same cycle of operation as hereinbefore described can be repeated. However, when the second transducer 28 is to shift so as to align with the track Td, clearing the track Tc located between the last track Tn and track Td, a switch assembly 113 (FIGS. 5 and 6) for detecting the position of the sliding plate 55 and, hence, the position of the first transducer head 27 with respect to the tracks Ta and Tb generates an output signal by which the solenoid unit 83 is additionally energized to shift the second transducer head 28, once aligned with the track Tc in the manner as hereinbefore described, from the track Tc to the track Td.

In the event that the solenoid unit 98 is energized in response to the input signal of predetermined frequency generated by a conventional originating circuit, which is entirely different from the frequency of the input signal carrying a telephone communication transmitted from the caller's telephone to the receiver's telephone, or in response to an input signal generated by a switch (not shown) provided in connection with the receiving circuit either such originating circuit or such switch being operated by the receiver who is at this time desirous to relisten to the caller's message, recorded on one particular track, because of his failure to do so or by any other reasons, the nail 94a can be aligned with the ratchet wheel 75 for reverse rotation of the indexing unit 70 with the second transducer head 28 reversely shifted so as to align with the previously recorded track from the track to which the head 28 has been aligned for recording. A switch 114 disposed in the vicinity of the indexing unit 70 and so designed as to be actuated by a projection 70d formed in the spirally stepped member 70b detects completion of full reverse rotation of the indexing unit 70 with the second transducer aligned with the first track Tl.

The solenoid unit 17 is utililzed to engage the pinch roller 11 to the capstan 5 for driving the endless tape T in the reverse direction from the take-up slot 21a to the feed slot 21b of the tape cartridge 21 when solenoid unit 17 is energized thereby to permit the solenoid armature 17a to be retracted. It is to be noted that an electrical circuit associated with the solenoid unit 16 is designed such as to be brought into inoperative position when the solenoid unit 17 is energized.

Although the present invention has been fully described by way of the preferred embodiment thereof with reference to FIGS. 1 to 17, it is to be noted that various changes and modifications are apparent to those skilled in the art. For example, some of these changes and/or modifications are shown in FIGS. 18 to 27, description of which will be hereinafter made.

Figures 18, 19:
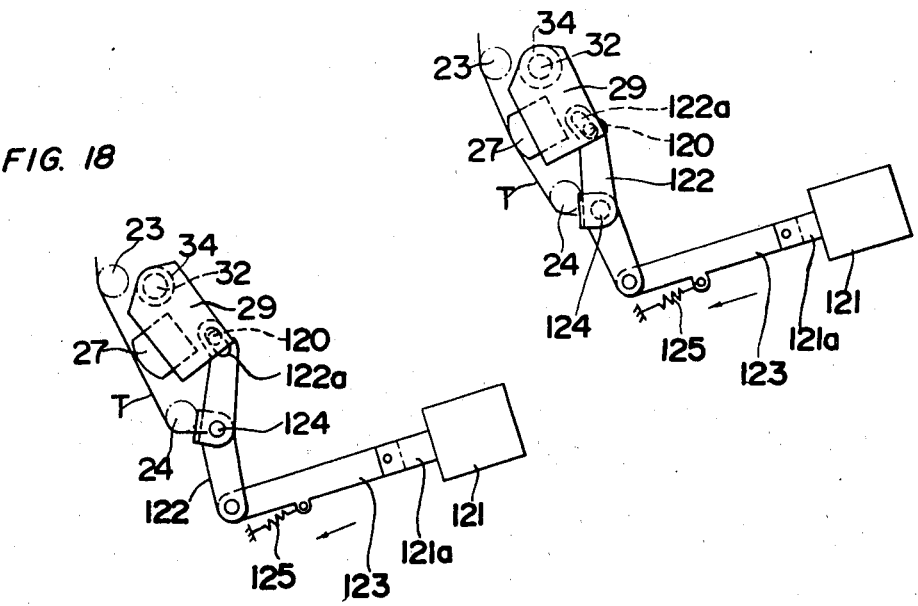
FIG. 18 is a schematic top plan view of a first transducer head coupled with a solenoid unit conditioned in one position.
FIG. 19 is a similar view to FIG. 18, but the solenoid being conditioned in another position.

Referring first to FIGS. 18 to 20, the first transducer head 27 is made to separate away from the path of travel of the magnetic tape T when head 27 is in the inoperative position. This is for the purpose of avoiding unnecessary contact between the tape T and the first transducer head 27 which may otherwise result in frictional wear of the tape T. Once frictional wear of the tape T takes place, it will lead to reduction of the level of signal from the first transducer head 27 reproducing any of the recorded tracks of the tape T.

To the above end, the support plate 29 for the first transducer head 27, which has been described as having the end opposite to the slide rod 32 mounted on the support rod 31 in the foregoing embodiment, is provided with an operating pin 120 which downwardly loosely extends through the chassis 1 as shown in FIG. 20. This operating pin 120 is connected with a solenoid 121 in such a manner as will be hereinafter described. The solenoid unit 121 having a solenoid armature 121a is pivotally connected with a link 122 through an intermediate link 123. The link 122 has one end formed with a slot 122a through which operating pin 120 loosely engages, and the other end pivotally connected with the intermediate link 123, a substantially intermediate portion of link 122 being pivotally secured to the undersurface of the chassis 1 by means of a pin member 124. The solenoid armature 121a is normally biased so as to outwardly extend by a tension spring 125 interposed, for example, between a fixed portion of the chassis 1 and a substantially intermediate portion of the intermediate link 123. This solenoid unit 121 is energized in response to receipt of the input signal from the caller's telephone and deenergized when the contact members 50 are shortcircuited after completion of reproduction of either of the tracks Ta and Tb, i.e., when switching takes place between the first and second transducer heads 27 and 28.

If the solenoid unit 121 is energized in such a manner, the solenoid armature 121a thereof is retracted against the tension spring 125, thereby causing the link 122 to pivot in the counterclockwise direction as shown in FIG. 19. As a result thereof, the support plate 29 is pivoted about the axis of the slide rod 32 with the first transducer head 27 contacting the running tape T. On the other hand, if the solenoid unit 121 that has been energized is deenergized, the solenoid armature 121a thereof is extended by the action of the tension spring 125 and, therefore, the support plate 29 is pivoted about the axis of the slide rod 32 with the first transducer head 27 moving away from the running tape T as shown in FIG. 18.

FIGS. 21 and 22 illustrate a modification directed to the pitch roller arrangement. In the example as shown, the pivotable lever 14 is shown as having an abutment 14b extending in the direction opposite to the pinch roller 10. Concurrently pivotally supported by the stand 12 is a carrier plate 125' having one edge rigidly connected with a spring plate 126 and the other edge opposite to such one edge being integrally formed with a lug 125a threadably carrying an adjustment screw 125b. The spring plate 126 is in turn connected with the solenoid 16 by means of such connecting elements as designated by 127 and 128, it being noted that the connecting element 127 is provided with a downwardly extending guide pins 127a adapted to engage in a slot (not shown) at the end of the intermediate lever 48 for transmitting the movement of the solenoid armature 16a to said intermediate lever 48 for the purpose as hereinbefore described in the foregoing embodiment.

In this arrangement, by adjusting the adjustment screw 125b having one end abutted against a portion 14c integral with the pivotable lever 14, the contact force exerted by the pinch roller 10 with respect to the capstan 4 can be adjusted. More specifically, if the adjustment screw 125b is adjusted in a fastening direction, the tip of the abutment 14b is forcibly pressed against the spring plate 126, thereby deforming the spring plate 126 while the pinch roller 10 is brought close to the capstan 4 with a smaller space left between pinch roller 10 and capstan 4 than that required in view of the stroke of movement of the solenoid armature 16a. On the other hand, if the adjustment screw 125b is adjusted in an undoing or loosening direction, a pressing force exerted by the pivotable lever 14 and transmitted to spring plate 126 through the tip of the abutment 14b is reduced without deforming the spring plate 126.

Accordingly, the arrangement shown in FIGS. 21 and 22 is very advantageous in that endless magnetic tapes of different thickness can be interchangeably utilized in the telephone monitoring system of the construction as hereinbefore described.

FIG. 23 illustrates a method of detecting tape breakage and variation of the tape speed. This detecting unit of FIG. 23 comprises a rotatable disc 130 rotatably supported above the chassis 1 by means of a shaft member 131 having one end journalled by the chassis 1 and the other end journalled by a two-legged bearing plate 132 secured to chassis 1. The rotatable disc 130 is formed with a plurality of rectangular slots and square slots, these two types of slots being alternately arranged at regular intervals. A rotatable guide pin 133, which may be of a similar construction as any one of the guide pins 23, 24, 25 and 26, extends above the chassis 1 and is rotatably carried by the chassis 1. This rotatable guide pin 133 is rotated by the tape running therearound, a rotational force of guide pin 133 being then transmitted to the rotatable disc 130 by means of an endless belt 134 thereby to rotate disc 130. To ensure an exact and reliable transmission of the rotational force of the rotatable guide pin 133 to disc 130, a pressure bar 134' is provided of a width substantially equal to or smaller than the width of the tape T used. This pressure bar 134' is pivotally supported by an additional guide pin 135 having both ends bearing presser bar 134' and carried by the chassis 1 in an upright position. The presser bar 134' is normally biased by a tension spring 136 so as to press the tape T against the rotatable guide pin 133 as shown.

Carried by the two-legged bearing plate 132 above the path of travel of the rectangular and square slots in the rotatable disc 130 is an electrical lamp 137, rays of light of which are received by a photocell (not shown) disposed in alignment with lamp 137 after having passed through the rectangular and square slots in the rotatable disc 130.

From the foregoing, it is clear that an output signal from the photocell has a pulsating characteristic composed of regularly spaced peak pulses alternately representing high and low intensities of the light respectively corresponding to the square and rectangular slots in the rotatable disc 130, when the latter is rotated. It is also clear that, once any variation occurs in the output signal from the photocell receiving the rays of light from the lamp 136 through the rotatable disc 130, an abnormal condition of the tape T running from the feed slot 21b to the tape-up slot 21a or from the take-up slot 21a to the feed slot 21b of the tape cartridge 21 can be advantageously detected. By way of example, if the output signal from the photocell shows any of continuously high or low level and zero level, i.e., when the rotatable disc 130 ceases to rotate, it means that breakage has occurred in the tape T. On the other hand, if the output signal from the photocell shows a pulsating characteristic having irregularly spaced pulses, it can be found that variation occurs in the tape speed.

Thus, by suitably processing the output signal from the photocell, operation of the telephone monitoring system can be stopped or the tape speed can be adequately controlled. The electrical circuitry necessary to achieve this purpose is not a part of the subject matter of the present invention and, therefore, the details thereof are neither described nor shown in the accompanying drawings.

The detecting unit of the foregoing construction may be disposed at any position on the chassis 1 and preferably between the capstan 5 and the guide pin 23.

Figure 24:
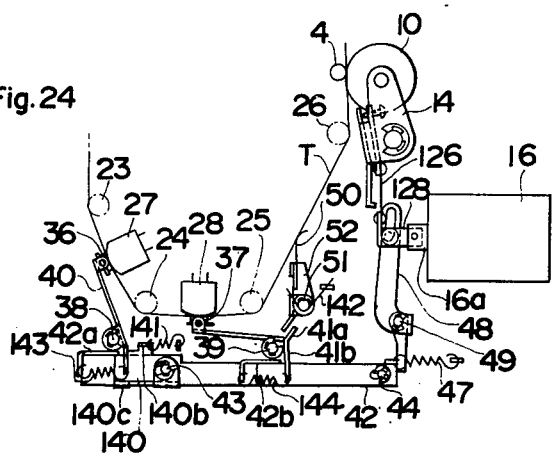
FIGS. 24 to 26 are top plan views of a modified padding mechanism conditioned in different positions, respectively.
Figure 25:
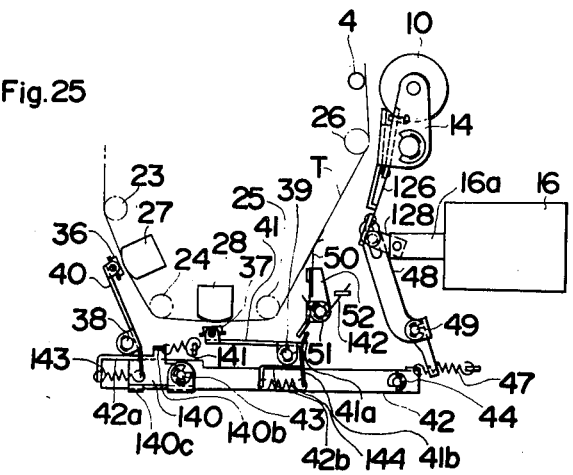
Figure 26:
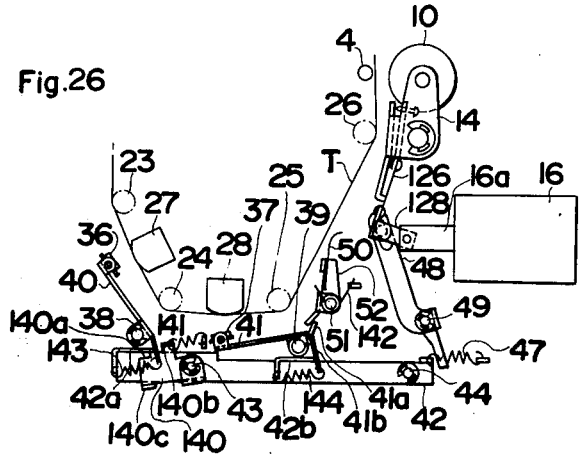

Referring now to FIGS. 24 to 26, a modification is made to the sliding plate 42 so as to render the latter movable among three positions. As is understood from the foregoing description, the sliding plate 42 in the foregoing embodiment is movable between first and second positions. However, according to the arrangement shown in FIGS. 24 to 26, an intermediate position is provided for movement of the sliding plate 42, between the first and second positions. To this end, a pivotable stopper 140 having a step or notched portion formed as at 140a as best shown in FIG. 26 is pivotally mounted on the pin 43 which is also utilized to secure the sliding plate 42 to the undersurface of the chassis 1. A tension spring 141 is interposed between a portion, as at 140b, of the stopper 140 and a fixed portion of the chassis 1 so that the pivotable stopper 140 is biased in one direction about the axis of the pin 43 with the step 140a tended to receive therein the projection 42a. The pivotable stopper 140 is also integrally formed with an upright projection 140c which serves as a manually operable handle for disengaging the projection 42a from the step 140a as will be described later.

While in the above arrangement, FIG. 24 illustrates the condition in which the sliding plate 42 is moved to the second position by the retraction of the solenoid plunger 16a in the manner as hereinbefore described. FIG. 26 illustrates the condition in which the sliding plate 42 is moved to the first position by the action of the tension spring 47 in the manner as hereinbefore described. However, it is to be noted that, during movement of the sliding plate from the second position to the first position, the linear path of travel of the projection 42a is obstructed by the pivotable stopper 140 with the step 140a facing projection 42a while stopper 140 is biased by the tension spring 141. Accordingly, the movement of the sliding plate 42 from the second position to the first position is restricted with the projections 42a and 42b causing the support levers 40 and 41 to pivot so as to separate the pad members 36 and 37 from the first and second transducer heads 27 and 28, respectively, as shown in FIG. 25. At this time, the arm 41a of the support lever 41 has not yet engaged the pivotable member 51 and, therefore, the contact members 50 are contacted to the tape T by the action of the spring element such as a coil spring shown by 142 in FIGS. 24 to 26.

While in the condition of FIG. 25, if the upright projection 140c and, hence, the manually operable handle is operated so as to pivot the stopper 140 against the tension spring 141, disengagement of the projection 42a from the step 140a takes place and, therefore, the sliding plate 42 moves to the first position by the action of the spring 47. Movement of the sliding plate 42 from the first position to the second position is effected in the manner as hereinbefore described by the solenoid unit 16.

The arrangement of FIGS. 24 to 26 is particularly advantageous when the shortcircuit between the contact members 50 is to be maintained even if the pad members 36 and 37 and the pinch roller 10 are respectively disengaged from the first and second transducer heads 27 and 28 and the capstan 4.

Furthermore, as shown in FIGS. 24 to 26, the spring elements, which are not shown in the foregoing description, but described as used to bias the support levers 40 and 41 respectively so as to cause the pad members 36 and 37 to engage the transducer heads 27 and 28, may be disposed such as indicated by 143 and 144.

FIG. 27 illustrate the shape of the crank wheel 84. The crank wheel 84 used in the indexing unit drive mechanism may be in the form having a varying radius. More specifically, in the crank wheel shown in FIG. 27, a cam surface is provided as at 84c so that the contact pressure exerted by the driven roller 80 to the drive wheel 79 through the belt 86 gradually increases as the detent roller 87 smoothly disengages from the detent recess 84a and subsequently slides over the cam surface 84c upon retraction of the solenoid armature 83a. This is possible because, as the roller 87 slides over the cam surface 84c on to the remaining peripheral rim of the crank wheel 84, the tension spring 90 is correspondingly pulled to accumulate an axial pulling force thereby to permit the pivotable lever 82 to pivot so as to firmly engage the driven roller 80 to the drive wheel 79 through the belt 86.

Accordingly, not only does slip not occur between the belt 86 and the drive wheel 79, but also the rotational force of the drive wheel 79 is reliably transmitted to the crank wheel 84, whereby rotation of the indexing unit 70 can be smoothly performed.

In view of the foregoing, therefore, the changes and modifications should be understood as included within the true scope of the present invention unless otherwise they depart therefrom.

What is claimed is:

1. An automatic telephone answering system comprising:

an endless magnetic recording tape having thereon a first group of recording tracks for recording and reproducing a first type of messages to be transmitted to a caller, a second group of recording tracks for recording and reproducing a second type of messages to the caller, and a third group of recording tracks for recording and reproducing messages from the caller, the numbers of said tracks of said first and second groups being equal, said tape having both ends joined to each other by a metallic foil secured thereto, thereby to make the tape endless;

means operatively positioned for driving said magnetic tape in one direction and comprising an electrically operated motor, a first solenoid unit having a solenoid armature movable between extended and retracted positions, a capstan, and a pinch roller operatively coupled to said solenoid armature, said capstan being rotated by said motor, and said pinch roller being selectively engaged to said capstan with the magnetic tape sandwiched therebetween, said tape being driven in said one direction by said capstan in cooperation with said pinch roller upon movement of said solenoid armature to said retracted position thereof;

a first movable selectively operable transducer head;

means operatively connected to said first transducer head for selectively aligning said first transducer head with any one of said tracks of said first group and for thereby permitting said first transducer head to record and reproduce information on said selected one of said tracks of said first group;

a second movable transducer head for recording and reproducing information on said second and third groups of tracks and operable when said first transducer head is inoperative;

means for stepwisely shifting said second transducer head in a first direction transversely of the lengthwise direction of said magnetic tape each time said first transducer head completes its operation to thereby align said second transducer head with said tracks of said third group one after another, and for, after all of the tracks of said third group have been used, aligning said second transducer head with one of the tracks of said second group which corresponds to said selected one of said tracks of said first group; said means for stepwisely shifting said second transducer head in said first direction comprising:

a stepped cam member;

a ratchet wheel coupled to said stepped cam member;

a trigger lever coupled to said ratchet wheel for driving said ratchet wheel;

a crank lever coupled to said trigger lever;

a pulley coupled to said crank lever;

a drive wheel;

transmission means coupled to said crank lever and to said drive wheel for transmitting driving force from said drive wheel to said pulley;

a first pivotable lever coupled to said transmission means for selectively activating said transmission means;

a seesaw lever coupled to said pivotable lever;

a roller element rotatably provided on one end of said seesaw lever;

a detent recess formed in said pulley, with driving force transmission from said drive wheel to said pulley being discontinued when said roller element engages said detent recess in said pulley, and with said driving force transmission means between said drive wheel and said pulley being operative when said roller element is disengaged from said detent recess;

a second solenoid unit having a plunger member;

said roller element of said seesaw lever being adapted to be disengaged from said detent recess of said pulley by said plunger member of said second solenoid unit; and said second transducer head being aligned with said tracks of said third group each time said first transducer head completes operation, and after all of the tracks of said third group have been used, being aligned with one of the tracks of said second group which corresponds to said selected one of said tracks of said first group; and means operatively positioned for stepwisely shifting said second transducer head in a second opposite direction transverse of the lengthwise direction of said magnetic tape for returning said second transducer head from a first position in which said second transducer head is aligned with said one of said tracks of said second group, to a second position in which said second transducer head is aligned with the first one of the tracks of said third group.

2. A system as claimed in claim 1, further comprising means for detecting the running condition of said magnetic tape; said plunger member of said second solenoid unit being operated when said magnetic foil of said magnetic tape is detected by said detecting means.

3. A system as claimed in claim 1, wherein said pinch roller is provided with means for adjusting the contact pressure which is exerted by said pinch roller toward said capstan when said pinch roller is engaged to said capstan with said magnetic tape sandwiched therebetween.

4. A system as claimed in claim 1, further comprising separate means for pressing said magnetic tape towards said first and second transducer heads in response to the engagement of said pinch roller to said capstan.

5. A system as claimed in claim 1, further comprising means operatively positioned for positioning said first transducer head in contact with said endless magnetic tape only during operation of said first transducer head and for separating said first transducer head from said endless magnetic tape upon operation of said second transducer head.

6. A system as claimed in claim 1, further comprising means for driving said magnetic tape in a direction opposite to said one direction and comprising a second capstan adapted to rotate in a direction opposite to the direction of rotation of said first capstan and coupled to said motor, a second pinch roller, a third solenoid unit positioned to press said second pinch roller against said second capstan with said magnetic recording tape held therebetween, a second pivotable lever having brake means, said first pinch roller being mounted on said second pivotable lever, a tape guide pin, a spring coupled to said brake means for biasing said brake means against said tape guide pin when said first solenoid unit is inoperative, said first solenoid unit being inoperative when said second solenoid unit is operative.

7. A system as claimed in claim 1, further comprising means for detecting completion of each run of said magnetic tape in cooperation with said magnetic foil, said detecting means comprising a pair of electrical contact members carried by a pivotable member in spaced relation with respect to each other, said pivotable member being pivotable in response to the movement of the solenoid armature of said first solenoid unit from said extended position to said retracted position thereof, thereby permitting said contact members to contact said magnetic tape, said contact members being shortcircuited by said metallic foil at the time of substantial completion of each run of said magnetic tape, said contact members being disengaged from said magnetic tape in response to movement of said solenoid armature from said retracted position to said extended position.

* * * * *